(No Model.)

T. J. NOLAN.
FISH HOOK.

No. 549,814. Patented Nov. 12, 1895.

WITNESSES
F. L. Ouzand
A. S. Smit

INVENTOR
Timothy J. Nolan
By H. B. Willson
Attorney

UNITED STATES PATENT OFFICE.

TIMOTHY J. NOLAN, OF LOGANSPORT, INDIANA.

FISH-HOOK.

SPECIFICATION forming part of Letters Patent No. 549,814, dated November 12, 1895.

Application filed May 9, 1895. Serial No. 548,708. (No model.)

*To all whom it may concern:*

Be it known that I, TIMOTHY J. NOLAN, a citizen of the United States, residing at Logansport, in the county of Cass and State of Indiana, have invented certain new and useful Improvements in Fish-Hooks; and I do declare the following to be a full, clear, and exact description of the invention, such as will enable others skilled in the art to which it appertains to make and use the same.

My invention relates to fish-hooks.

The object of the invention is to provide a fish-hook which shall be of such construction that when a fish is hooked it will be impossible for it to free itself from the hook, and which shall be simple of construction and comparatively inexpensive of production.

With this object in view the invention consists in certain features of construction and combination of parts which will be hereinafter fully described and claimed.

Figure 1:
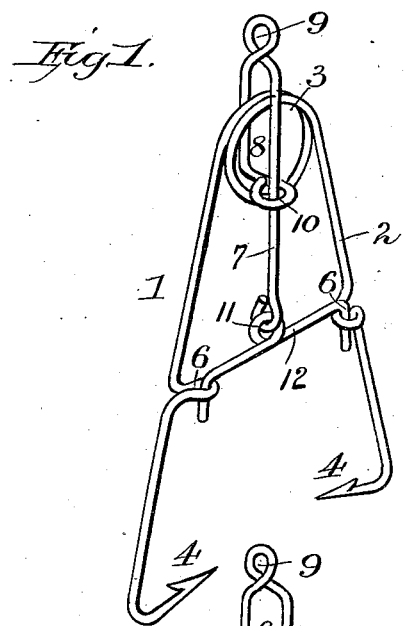
Figure 2:
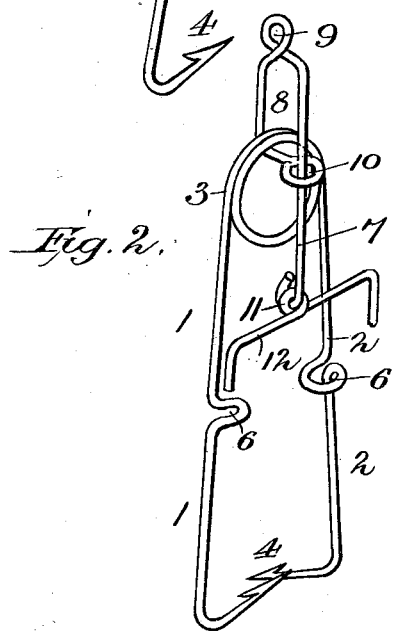

In the accompanying drawings, in which like numerals of reference denote like parts in both views, Figure 1 is a perspective view of my improved fish-hook, showing it set. Fig. 2 is a similar view of the hook after it has been sprung.

In the drawings, 1 and 2 denote two shanks or limbs joined together at their rear ends by a coil-spring 3 and having their forward ends shaped in the usual hook form, as shown at 4, while the intermediate portions of the shanks are provided with eyes 6. These parts above described may be made from a single piece of wire, as shown in the accompanying drawings, but not necessarily.

A rod 7, provided with a loop 8, by means of which the rod is secured to the coil-spring, has at one end an eye 9, to which is attached the end of the line, and at its other end a similar eye 10 is formed. In this latter eye is secured the eye 11 of a spreader 12, the bent ends of which are adapted to be inserted through eyes 6 of the hook-shanks and hold them apart, as shown in Fig. 1.

In operation bait is fixed on either or both of the hooked ends of the shanks, which are pulled apart or separated to allow the ends of the spreader to be inserted into the eyes 6, thus holding the shanks apart against the action of the spring. The hook is now cast, and when a fish swallows one of the hook-ends and starts away the line will become taut and the spreader will be released from the eyes of the shanks, allowing them to spring together and securely hook the fish, so that it will be impossible for it to free itself from the hook.

Although I have shown and described my preferred construction, it is obvious that slight changes may be made without departing from the spirit of my invention. I would therefore have it distinctly understood that I reserve to myself the right to make such changes in construction and arrangement of parts as may come within the scope of my claim.

Having thus described my invention, what I claim, and desire to secure by Letters Patent, is—

A fish hook, comprising two shanks, the rear ends of which are connected by an integral coil spring and the forward ends of which are formed into opposing hooks, while the intermediate portions are formed with eyes, a spreader having bent ends to engage said eyes, and a rod connected with said coil spring and having its lower end loosely connected with said spreader and adapted to release the bent ends of the spreader from the eyes of the shank, substantially as set forth.

In testimony whereof I affix my signature in presence of two witnesses.

TIMOTHY J. NOLAN.

Witnesses:
 WALTER SCHWEINZGER,
 CHARLES BUHRMESTER.